Figure 1:
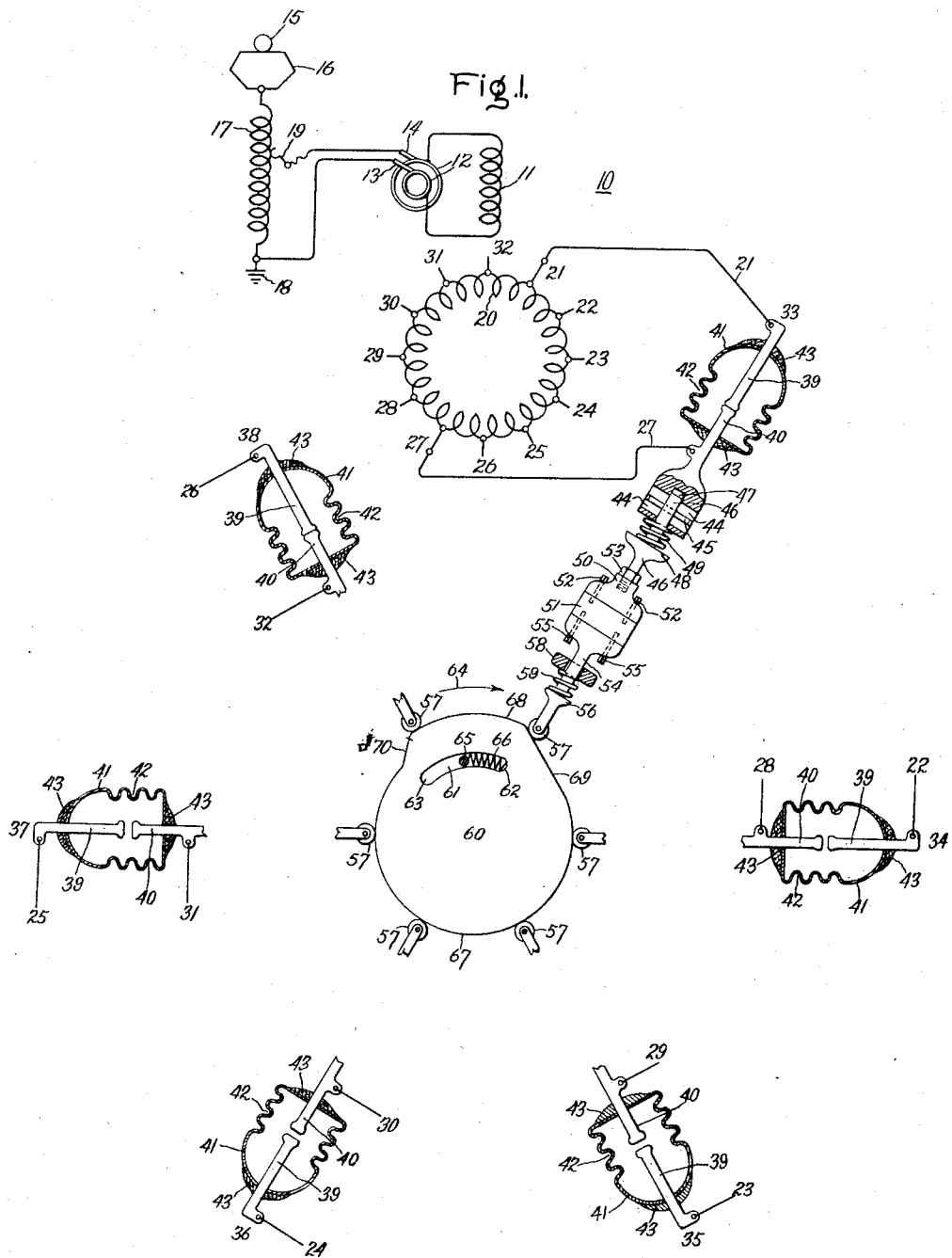

July 7, 1931.  D. C. PRINCE  1,813,764
DYNAMO ELECTRIC MACHINE
Filed July 29, 1930  2 Sheets-Sheet 1

Inventor:
David C. Prince.
by Charles E. Tullar
His Attorney.

July 7, 1931.                  D. C. PRINCE                1,813,764
                           DYNAMO ELECTRIC MACHINE
                    Filed July 29, 1930        2 Sheets-Sheet 2
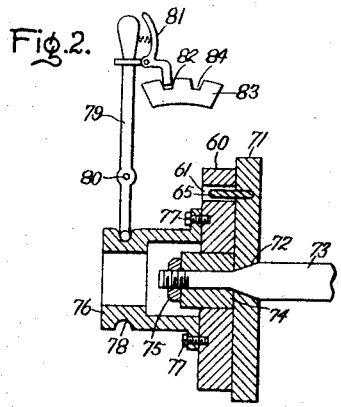
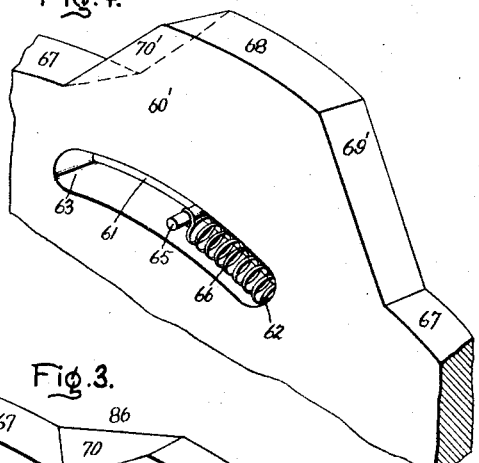
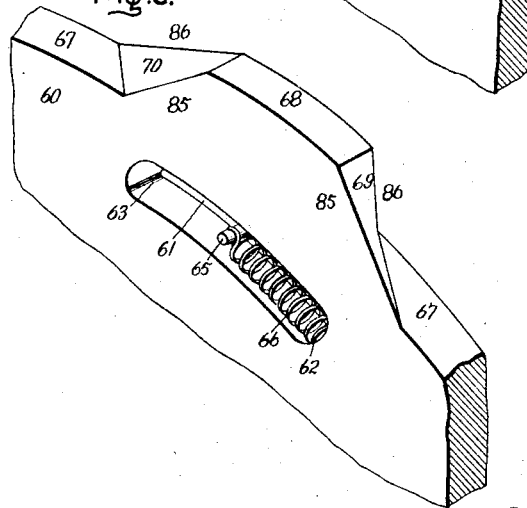
Inventor:
David C. Prince,
by Charles E. Mullen
His Attorney.

Patented July 7, 1931

1,813,764

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

DYNAMO ELECTRIC MACHINE

Application filed July 29, 1930. Serial No. 471,507.

The principal object of my invention is to provide a dynamo electric machine without the usual form of commutator but which operates as if it had such a commutator. I prefer to describe my invention in connection with alternating current machines requiring the functions of a commutator because it is more difficult to obtain satisfactory commutation on them than on direct current commutator machines although my invention is applicable to both types of machines.

In the alternating current machine employing a commutated winding to carry all of its load current there is not only the load current in the coil short-circuited by the commutator brushes but there is also a relatively large additional current flow in the short-circuited coil induced by transformer action between the short-circuited coil and the field windings. The induced current in the short-circuited coil lags behind the load current and therefore the usual commutating devices are ineffective to prevent sparking when the short-circuited coil leaves the brushes. The induced current is especially heavy at low speeds, thus causing destructive sparking and resulting in short life of the commutator and brushes even with conservative designs. High voltages can not be safely used on commutators, thus increasing the current for a given rating which further increases the sparking. Various devices have been tried to improve commutation but none have been really successful because they only reduce and do not eliminate the induced current.

The usual dynamo electric machine employing a commutated winding has a stationary field winding connected to the source of current, a rotatable commutated winding, and stationary commutator brushes. These windings may be interchanged, namely a rotatable field winding and a stationary commutated winding, but it is then necessary to have rotating brushes on the commutator so as to obtain a rotating magnetic axis on the stationary winding in order to obtain rotation of the field winding. The rotating brushes result in mechanical complications without improving the commutation. My invention eliminates commutator sparking and mechanical complications by providing a rotatable field winding, a stationary winding without a commutator, and a plurality of switches connected to the stationary winding, these switches being operated in a manner to produce a rotating magnetic axis on the stationary winding, thus producing rotation of the field winding. My invention will be best understood from the following description when considered in connection with the accompanying drawings while the features of my invention which are believed to be novel and patentable are pointed out in the appended claims.

Fig. 1 represents a preferred form of my invention as applied to a two-pole, single phase repulsion motor for driving electric locomotives. Fig. 2 represents a preferred form of the means used for driving the cam shown in Fig. 1 so as to operate the switches. Figs. 3 and 4 represent sections of the contours of two types of cams that may be used.

In Fig. 1, 10 represents the repulsion motor consisting of a rotatable primary winding 11 connected to collector rings 12 on which rest brushes 13 and 14. Power to the motor is supplied from the line 15 by the sliding trolley 16. One end of auto-transformer 17 is connected to 16 and the other end is connected to a grounded point 18. The brush 13 is connected to the point 18 and the brush 14 is connected to an adjustable arm 19 on the auto-transformer 17. Inductively related to winding 11 there is a stationary winding 20 which is represented as a ring winding for the sake of simplicity but which in reality is the same as the usual direct current, drum wound, lap winding connected to a commutator, namely a plurality of distributed coils, the winding pitch of each coil being 180 degrees because I assumed a two-pole motor. The two ends of each coil are respectively represented by the diametrical lines 21 and 27, 22 and 28, 23 and 29, 24 and 30, 25 and 31, 26 and 32. Six switches are represented by 33 to 38 inclusive and in each switch, 39 and 40 respectively represent a stationary and movable contact electrically connected to the ends of a coil on the winding 20. The switches 33 to 38 inclusive are similar in construction and the numbers given to the leads connected to the contacts of each switch show the coil ends on the winding 20 to which these contacts are to be connected. To simplify the drawing, only the switch 33 has been drawn in detail and only the contacts of the switch 33 have been shown connected to the ends of a coil on the winding 20. The adjacent ends of the contacts of each switch are enclosed in a chamber consisting of a suitable insulating casing 41 to which there is secured a sylphon bellows 42. The chamber is either evacuated or filled with any inert gas or any gas substantially devoid of oxygen and air is prevented from entering the chamber by means of the sealing compound 43 where the contacts enter the chamber. The contact 40 has two slots 44 in which slides the pin 45 secured to one end of rod 46 which slides in the bored hole 47 of the contact 40. The rod 46 has a shoulder 48 and a small size open coil compression spring 49 is placed between 48 and the bottom of 40. The other end of rod 46 is threaded into the bracket 50 secured to the insulation block 51 by bolts 52. The nut 53 locks 46 into 50. A rod represented by 54 is secured to 51 by bolts 55. The rod 54 has a shoulder 56 and a roller 57. A stationary guide plate is represented by 58, and 59 represents a medium size open coil compression spring between 56 and 58. A rotatable cam represented by 60 has a circular slot 61 whose leading and trailing ends are respectively represented by 62 and 63. I am assuming the cam is rotated clockwise as shown by the arrow 64, the cam being rotated by the pin 65 in slot 61. The pin 65 is driven with the rotating element of the motor. The pin 65 exerts its driving force through the spring 66 secured to the slot end 62, and a relatively large clearance is maintained between the pin 65 and the slot end 63 for purposes explained hereinafter. The contour of the cam 60 contains two portions of circular paths 67 and 68 having different radii and which are connected on the leading side of cam rotation by a sloping path 69 having a relatively slight inclination and on the trailing side of cam rotation by a sloping path 70 having a relatively large inclination. The purpose of the insulating blocks 51 is to prevent electrical connection between the movable contacts 40 of the different switches since the cam 60 and the rollers and rods of the switches are usually made of metal. The switches 33 to 38 inclusive and hence their rollers 57 are placed so as to be in substantially equal angular spacing around the cam 60 and in each switch the spring 59 biases the roller 57 into contact with the cam contour. In each switch the rod 46 is adjusted into or out of 50 so that when the roller 57 is on the path 67 the contacts of the switch are separated. The path 69 is made so that when the roller 57 of a switch has travelled from the circular path 67 to nearly the top of path 69 the motion of the roller as transmitted through 54, 51, 50, 46 and spring 49 causes contact 40 to engage contact 39 and thus when the roller is on path 68 the contacts are engaged with a moderate compression of spring 49, thus insuring good contact between 39 and 40 even with slight mechanical variations or wear of the parts. The length of the path 68 and the shape of the path 70 are such that when the roller 57 of a switch has travelled partly down the path 70 the pin 45 in slot 44 separate contact 40 from contact 39 after the contacts of another switch have been brought into engagement by its roller arriving near the top of path 69.

A better explanation of the operation of my invention can be given by first describing a preferred form of the means that may be used for driving the cam, these means being represented in Fig. 2. In this figure the cam and its slot are represented by 60 and 61 respectively and the pin 65 in the slot 61 is secured to the plate 71 which is assembled on the taper fit 72 of the motor shaft 73. The plate 71 is tightened on 72 by the sleeve 74 and the nut 75 threaded on the end of 73. The cam 60 has a sliding fit on the sleeve 74. A bracket 76 is secured to cam 60 by bolts 77. The bracket 76 has a groove 78 in which slides the end of lever 79 which is fulcrumed on pin 80. The lever 79 has a clutch 81 which may be secured in the notch 82 of the bracket 83 as shown or the clutch may be secured in the notch 84 of bracket 83.

The following description considered in connection with Figs. 1 and 2 explains the operation of my invention. The usual two-pole repulsion motor has a stationary field winding and a rotatable commutated winding on whose commutator rest two rows of brushes electrically connected by a short-circuiting lead and the brushes are positioned so that the armature magnetic axis is about 30 degrees ahead of the field winding magnetic axis in the direction of motor rotation. Assumed that the ends of the coils in the winding 20, Fig. 1, are so brought out of the winding that the magnetic axis of the winding 20 corresponds to a line connecting those ends of a coil which are short-circuited by one of the switches. Assume also that clockwise rotation of the motor is desired. The proper relation between the stator and rotor magnetic axes of the repulsion motor shown in Fig. 1 is obtained as follows: Assume the motor at standstill, the magnetic axis of the field winding 11 is first determined, the nut 75 in Fig. 2 is loosened and the plate 71 is tapped loose from its taper fit. The plate 71 is rotated clockwise by hand, thus also rotating the cam 60, until the contacts have just opened on a switch whose roller is on the path 70, Fig. 1, and another switch whose roller is on the path 69 short-circuits those ends of a coil which corresponds to the winding 20 having a magnetic axis about 30 degrees clockwise ahead of the magnetic axis of the winding 11. The plate 71, Fig. 2, is then retightened on 73 by tightening nut 75 and the correct relation between the magnetic axes of the stationary and rotatable windings is obtained. With the field winding 11 energized the motor 10 starts as the usual repulsion motor since the induced currents flowing in winding 20 react with the flux produced by winding 11 to produce rotation of winding 11.

The rotation of winding 11 rotates its magnetic axis clockwise at a rate determined by its speed. The cam 60 rotates at the same speed as the winding 11 and successively closes the contacts of one switch after another at a rate substantially proportional to the speed of winding 11. The magnetic axis of the stationary winding 20 is therefore rotated at the same rate as the rotation of the magnetic axis of the winding 11 thus substantially maintaining the adjusted relation between the magnetic axes of windings 11 and 20 and thus the motor is caused to operate as a repulsion motor. During the interval a switch is closed, the magnetic axis of the stationary winding 20 is fixed while the magnetic axis of winding 11 is rotating, but by providing a sufficient number of switches the closed interval of each switch is small and it may be correctly stated that a substantially constant relation between the magnetic axes of windings 11 and 20 is maintained during rotation.

As previously described, each switch is opened slightly after another switch has closed. This is a precautionary measure to insure a current carrying coil at all times to prevent even a momentary loss of motor torque but it results in two switches being closed for a slight interval of time. As shown in Fig. 1 for example, the switches 33 and 38 are both closed for a slight interval of time thus simultaneously short-circuiting the ends 21 and 27 through the switch 33 and the ends 26 and 32 through the switch 38. There will now be two circuits for the induced currents flowing in winding 20, one circuit being completed through 21, 33 and 27 and the other circuit being completed through 26, 38 and 32. The magnetic axis of one circuit is a line connecting 21 and 27 and the magnetic axis of the other circuit is a line connecting 26 and 32. These two magnetic axes have nearly the same direction and the currents flowing in these two circuits produce torques in the same directions but since these circuits are displaced in phase by the amount which their magnetic axes are displaced the instantaneous values of the voltages induced in these circuits will be unequal and a local circulating current will flow between these circuits. Thus at the instant assumed the polarities and relative values of the unequal voltages may be such that a circulating current will flow from 21 through the short section of the winding 20 to 32, through the switch 38 to 26 and through the short section of the winding 20 to 27. The current flowing in these short sections produces a magnetic flux which opposes the flux of winding 11, thus reducing the torque of the motor during the interval that both switches are closed. As the cam 60 rotates the switch 38 opens and the motor torque returns to its normal value with one switch closed until the cam closes switch 34, thus again reducing the motor torque until the rotation of the cam opens switch 33, etc. It follows that every time two switches are simultaneously closed there will be two short sections of the winding 20 tending to demagnetize the field of the motor, thus lowering the motor torque and resulting in the average motor torque being less than the value it would have with one switch closed. During rotation of the motor there are voltages induced in those short sections which oppose the voltage that circulates the current through those short sections. At some substantial speed these voltages are equal and there will be no local circulating current through the short sections and the motor torque will be substantially the same with one switch closed and with two switches closed. It follows that the demagnetizing effect of the short sections are substantial only at the low speeds. I can considerably reduce the disadvantage resulting from this demagnetizing effect at low speeds by decreasing the interval of time during which two switches are closed, this result being accomplished as follows: When the roller 57 of switch 38 goes down slope 70, the spring 59 of switch 38 causes a pressure between 57 and 70 and as 70 has a relatively large inclination the component of this pressure in the direction of motor rotation is sufficient to cause the cam 60 to move at a greater rate of speed than it would be driven by the pin 65 during the interval the roller 57 goes down slope 70. The length of the slot 61 is such that the pin 65 does not touch the end 63 when the cam 60 is urged ahead of its driving relation with pin 65 and the spring 66 prevents a sudden jolt when the pin 65 catches up to again drive cam 60. It follows that the interval of time during which the switches 33 and 38 are both closed is much less than the interval would be if the cam 60 did not move at a greater rate of speed than the pin 65 when a roller 57 goes down the slope 70. As this reduction in the interval is true with any pair of switches it follows that there is a reduction in the interval of time during which the demagnetizing effect exists and therefore the average motor torque has nearly the same value it would have with only one switch closed at a time. As the motor speed increases the inertia of the parts gradually reduces the tendency of the cam 60 to move at a greater rate of speed than the pin 65 when a roller goes down the slope 70 but at higher speeds such cam movement is unnecessary since the demagnetizing effect is negligible and at a certain speed the demagnetizing effect is substantially zero. The speed of the motor 10 may be varied by employing any suitable switching means betwen the switches and the coil of winding 20 so as to change the magnetic axis of winding 20, thus changing the relation between the magnetic axes of windings 11 and 20. The speed is also varied by moving the arm 19 on auto-transformer 17.

It is obvious that the operation of the switches as described perform the function of a commutator and rotating brushes rubbing thereon and I have therefore eliminated the commutator, brushes and commutating windings that are usually employed, thus reducing the size of the motor and also eliminating commutator sparking. The spark caused by the separation of the contacts in the switches causes very little burning of the contacts because the spark occurs in a chamber substantially devoid of oxygen. In addition, the use of the switches permits high voltages to be used in winding 20, thus reducing the current for a given rating and reducing the size of the conductors in the winding 20 or without reducing the current rating it is possible to have fewer coils than in the ordinary motor and thus the number of switches will be small compared to the commutator bars in the ordinary motor. If large amounts of power are to be interrupted by the contacts of switches 33 to 38 inclusive, it will be desirable to adopt measures directed toward reducing the burning of the switch contacts to a minimum. This result can be obtained by operating the switches with highly evacuated chambers after the inner walls of the chambers and all parts within the chambers have been freed of their occluded gases and by having the contacts 39 and 40 of suitable material, all of these operating factors being described in my copending patent application, Serial No. 264,114, filed March 23, 1928, and assigned to the assignee of this invention.

Fig. 3 represents a perspective view of a portion of the cam shown in Fig. 1, similar parts being represented by the same numbers. In Fig. 3 it is seen that at the front edge 85 of the cam 60, the slope 69 has a relatively slight inclination and the slope 70 has a relatively large inclination, whereas at the back edge 86 of the cam 60 the slope 69 has a relatively large inclination and the slope 70 has a relatively slight inclination. For clockwise motor rotation the rollers 57 (Fig. 1) should ride on the cam near the front edge 85 and the effective cam contour will be as shown in Fig. 1. Electric locomotives are run in both directions without turning the locomotive around, thus requiring motors which can be easily reversed. The motor rotation may be reversed by any suitable switching means which makes proper connections between the switches and winding 20 so as to give the correct relation between the magnetic axes of windings 11 and 20 for the reverse rotation and the rotation of the cam operates so as to maintain this relation. I have not shown switching means because any ordinary switches may be used, these being well known and forming no part of my invention. The reverse motor rotation however requires an interchange of the inclinations of slopes 69 and 70 as shown in Fig. 1 if it is desired to greatly reduce the disadvantage resulting from the demagnetizing effect when two switches are closed. The effect of an interchange of inclinations is obtained by moving the cam 60 (Fig. 3) so that the rollers 57 will ride on the cam near the back edge 86 instead of near the front edge 85. The cam 60 is moved by moving the lever 79 (Fig. 2) so that the clutch 81 engages notch 84.

Fig. 4 shows a perspective view of a portion of the cam that may be used when the motor is non-reversible in operation. In Fig. 4 similar parts to those in Fig. 3 are represented by the same numbers. In Fig. 4, the cam is represented by 60', the slope 69' has a relatively slight inclination over its entire width and the slope 70' has a relatively large inclination over its entire width. For clockwise rotation of the motor the cam is assembled as shown in Fig. 1 and for counter clockwise rotation the cam is turned over so as to interchange the relative positions of slopes 69' and 70'.

I have described my invention in connection with a two-pole single phase repulsion motor but it is obvious that my invention is applicable to any dynamo electric machine requiring the functions performed by a commutator and brushes rubbing thereon. I have illustrated a preferred embodiment of my invention but many modifications can readily suggest themselves to those skilled in the art without departing from the principles of my invention and I therefore wish it understood that all modifications coming within the true spirit and scope of my invention are intended to be included within the scope of the appended claims.

What I claim as new and desire to secure by Letters Patent of the United States, is:

1. A dynamo electric machine comprising a rotatable winding, a stationary winding consisting of a plurality of distributed coils inductively related to said rotatable winding, and means for producing a rotating magnetic axis of said stationary winding, the said means comprising a plurality of mechanically operated switches each having a pair of relatively movable contacts electrically connected to said stationary winding, means for bringing the contacts of one switch after another into engagement at a rate substantially in proportion to the speed of said rotatable winding, and means for separating the contacts of each switch only after the contacts of another switch are in engagement.

2. A dynamo electric machine comprising a rotatable winding, a stationary winding consisting of a plurality of distributed coils inductively related to said rotatable winding and means for producing a rotating magnetic axis of said stationary winding, the said means comprising a plurality of switches each having two relatively movable contacts electrically connected to said stationary winding, biasing means tending to separate said contacts, and a sealed chamber enclosing the adjacent ends of said contacts, means for bringing the contacts of one switch after another into engagement at a rate substantially in proportion to the speed of said rotatable winding, and means for permitting the biasing means of each switch to separate its contacts only after the contacts of another switch are in engagement.

3. A dynamo electric machine comprising a rotatable winding, a stationary winding consisting of a plurality of distributed coils inductively related to said rotatable winding, and means for producing a rotating magnetic axis of said stationary winding, the said means comprising a rotatable cam whose contour contains two portions of circular paths having different radii connected by two sloping paths, means to rotate said cam at a speed proportional to the speed of said rotatable winding, and a plurality of switches substantially equally spaced around said cam contour, each switch consisting of stationary and movable contacts electrically connected to said stationary winding, a chamber substantially devoid of oxygen enclosing the adjacent ends of said contacts, a roller engaging the contour of said cam, means for transmitting the motion of the roller to the movable contact and biasing means to retain the roller in contact with the cam contour.

4. A dynamo electric machine comprising a rotatable winding, a stationary winding consisting of a plurality of distributed coils inductively related to said rotatable winding, and means for producing a rotating magnetic axis of said stationary winding, the said means comprising a rotatable cam having a circular slot and a contour with two portions of circular paths having different radii connected by a sloping path of relatively slight inclination at the leading side of cam rotation and by a sloping path of relatively large inclination at the trailing side of cam rotation, a driving pin in said circular slot with a relatively large clearance between said pin and the trailing end of said slot, means to rotate said pin at a speed proportional to the speed of said rotatable winding and a plurality of switches substantially equally spaced around said cam contour, each switch consisting of stationary and movable contacts electrically connected to said stationary winding, a chamber substantially devoid of oxygen enclosing the adjacent ends of said contacts, a roller engaging the contour of said cam, means for transmitting the motion of the roller to the movable contact, and biasing means to retain the roller in contact with the cam contour.

5. A dynamo electric machine comprising a rotatable winding, a stationary winding consisting of a plurality of distributed coils inductively related to said rotatable winding, and means for producing a rotating magnetic axis of said stationary winding, the said means comprising a rotatable cam having a circular slot and a contour with two portions of circular paths having different radii connected by two sloping paths, one sloping path having relatively slight and large inclinations at the front and back ends of the cam respectively and the other sloping path having relatively large and slight inclinations at the front and back ends of the cam respectively, a driving pin in said circular slot with a relatively large clearance between said pin and the trailing end of said slot, means to rotate said pin at a speed proportional to the speed of said rotatable winding, and a plurality of switches each consisting of stationary and movable contacts electrically connected to said stationary winding, a chamber substantially devoid of oxygen enclosing the adjacent ends of the contacts, a roller engaging the contour of said cam, means for transmitting the motion of the roller to the movable contact, and biasing means to retain the roller in contact with the cam contour; the rollers of the switches being substantially equally spaced around the cam contour and substantially in the same plane near one end of the cam, and means for axially moving the cam so that the rollers will be near the other end of the cam.

6. A dynamo electric machine comprising a rotatable winding, a stationary winding consisting of a plurality of distributed coils inductively related to said rotatable winding, and means for producing a rotating magnetic axis of said stationary winding, the said means comprising a rotatable cam whose contour contains two portions of circular paths having different radii connected by two sloping paths, means to rotate said cam at a speed proportional to the speed of said rotatable winding, a plurality of switches substantially equally spaced around said cam contour, each switch consisting of stationary and movable contacts electrically connected to said stationary winding, the said movable contacts being adapted to move radially in respect to the cam, and means for actuating the movable contact of each switch in accordance with the variation in the radius of the cam contour in radial line with said movable contact.

In witness whereof, I have hereunto set my hands this 28th day of July, 1930.

DAVID C. PRINCE.